UNITED STATES PATENT OFFICE.

JOHN BÉNÉ, OF BROOKLYN, NEW YORK.

IMPROVEMENT IN REFINING AND BLEACHING HAIR.

Specification forming part of Letters Patent No. 184,577, dated November 21, 1876; Reissue No. 7,850, dated August 21, 1877; application filed July 27, 1877.

*To all whom it may concern:*

Be it known that I, JOHN BÉNÉ, of the city of Brooklyn, in the county of Kings and State of New York, have invented a certain new and useful Improvement in Processes for Refining and Bleaching Hair, which process is fully set forth and described in the following specification.

This invention has for its object the refining and bleaching of all grades of coarse hair, which, in its natural state, has but little value, besides being entirely unfit for toilet purposes, the manipulation of such coarse hair by the chemical process to be hereinafter described resulting in its being transformed to a degree of fineness of texture equal to the finest grades of human hair, now so much sought for. Such hair, after being refined by the process alluded to, is then subjected to any of the usual and well-known dyeing processes for the purpose of obtaining any desired color, which colors are afterward set and made permanent by a further process, which will also be fully set forth.

In carrying out my invention, for the purpose of producing from the coarse hair alluded to a soft hair of very fine texture, I prepare, in a vat, jar, or other suitable vessel, a chemical bath or solution composed of about four quarts of muriatic acid and about one ounce of chlorate of potash. Into this bath or solution the hair to be treated is dipped and manipulated until the desired degree of fineness is obtained. The action of this composition of chemicals upon the hair serves to remove therefrom all the coarse fiber, and reduces it in bulk until it reaches a condition unlike its original state.

This process is applicable to hair of any color, the refining action of the chemicals being the same in all cases, although the dark shades are, of course, brought to a lighter hue, and the shades of color so obtained may be retained, or the hair, after refining, dyed in the usual manner.

In the practical use of this process muriatic acid is the principal acid used; but in cases where the hair is to receive excessive bleaching, the action of the bath is intensified by the addition thereto of a proportional part of either nitric, sulphuric, or hydrofluoric acid, according to circumstances.

In either case I set or fix the colors permanently, as follows: In any suitable form of vessel I prepare a bath of four gallons of warm water, one quart of muriate of tin, one ounce of bisulphite of soda, and four ounces of muriatic acid.

The refined, or the refined and dyed, hair is then immersed in the bath and manipulated until the colors are firmly set.

As a finishing process for removing all impurities, I wash the hair in a final bath of water and ammonia, after which it is spread and dried, when it is ready for market.

The hair, after being manipulated by the process as above described, loses all of its original harshness of texture and color, and assumes that of a soft, silken texture, having a brilliant luster, which is permanently retained.

This process is applicable not only to the refining of the coarse grades of human hair, but also to the hair forming the manes and tails of animals, the same results being obtained in both cases—that is, a product equaling and rivaling the finest grades of human hair.

I claim as my invention—

1. The process of refining all grades of coarse hair by bathing and manipulating the same in a chemical bath composed of acids and chlorate of potash, the component parts of such bath being substantially in the quantities as hereinbefore set forth.

2. The process of fixing or setting the colors of hair previously refined and bleached in a chemical bath of acids and chlorate of potash, and afterward dyed or not, by immersing and manipulating the same in a bath composed of warm water, muriate of tin, bisulphite of soda, and muriatic acid, the component parts of such bath being the quantities substantially as hereinbefore set forth.

3. The process of refining and bleaching all grades and classes of coarse hair, which process consists of, first, bathing and manipulating the same in a chemical bath composed of acids and chlorate of potash, which refines and bleaches the hair; second, in bathing the hair so refined and bleached in a bath of warm water, muriate of tin, bisulphite of soda, and muriatic acid, which bath fixes or sets the color; and, third, in finally bathing the hair so refined, bleached, and manipulated, in a bath composed of water and ammonia, which final bath cleanses and removes all impurities therefrom, the component parts of said baths being in the quantities substantially as hereinbefore set forth.

4. As a new article of commerce and manufacture, hair of fine texture produced from any grade of coarse hair, either animal or human, by a process of refining and bleaching, substantially as and in the manner herein shown and set forth.

JOHN BÉNÉ.

Witnesses:
A. L. MUNSON,
E. G. WARD.